H. W. PAULUS.
APPARATUS FOR EFFECTING CHEMICAL REACTIONS BY MEANS OF AMALGAMS.
APPLICATION FILED FEB. 26, 1921.
1,411,507.
Patented Apr. 4, 1922.
3 SHEETS—SHEET 2.
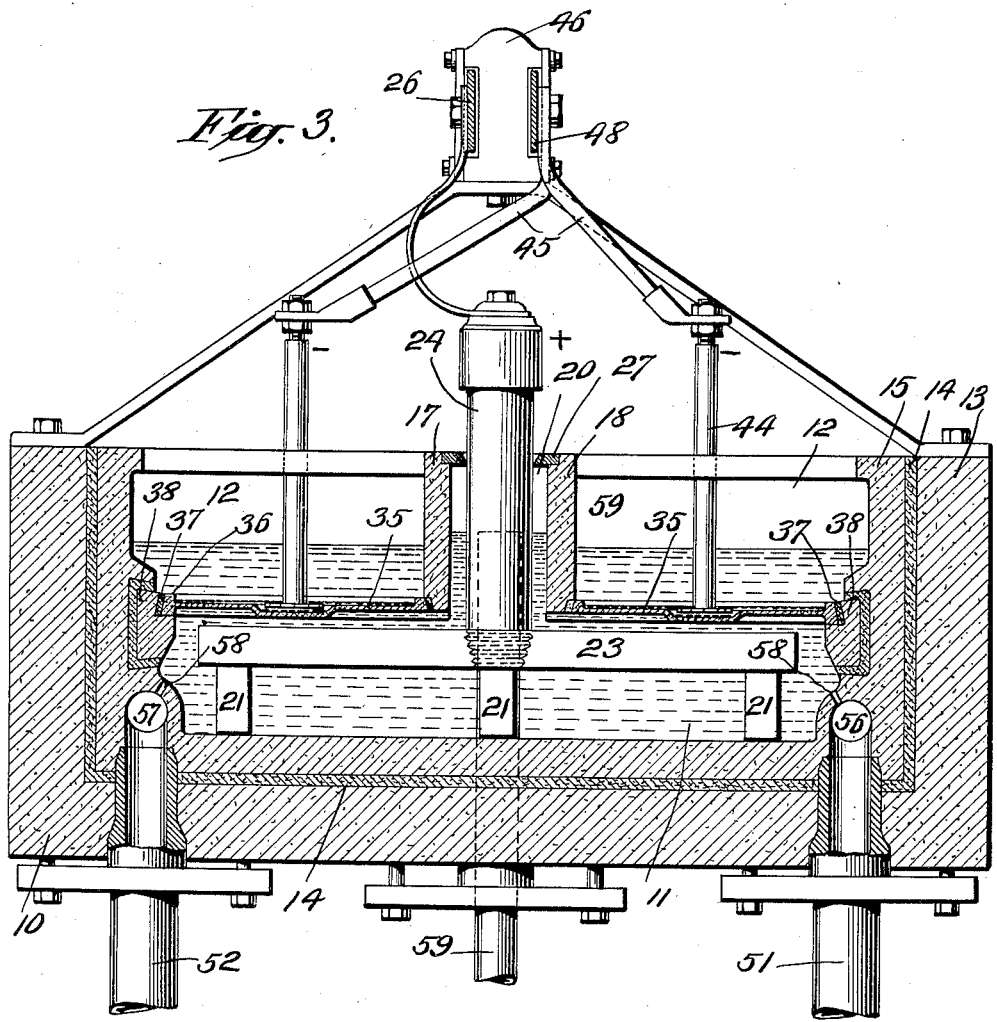
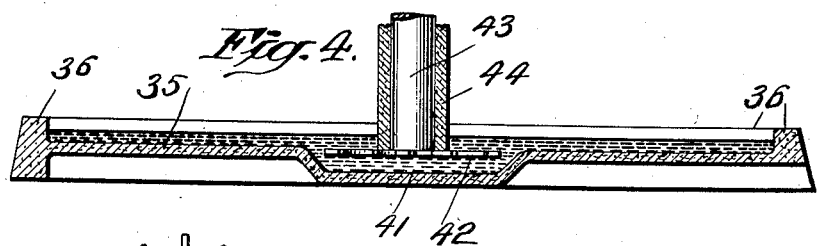
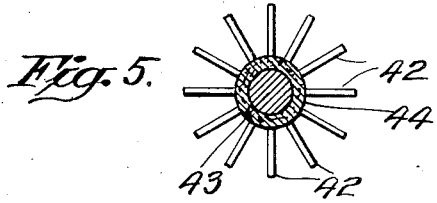

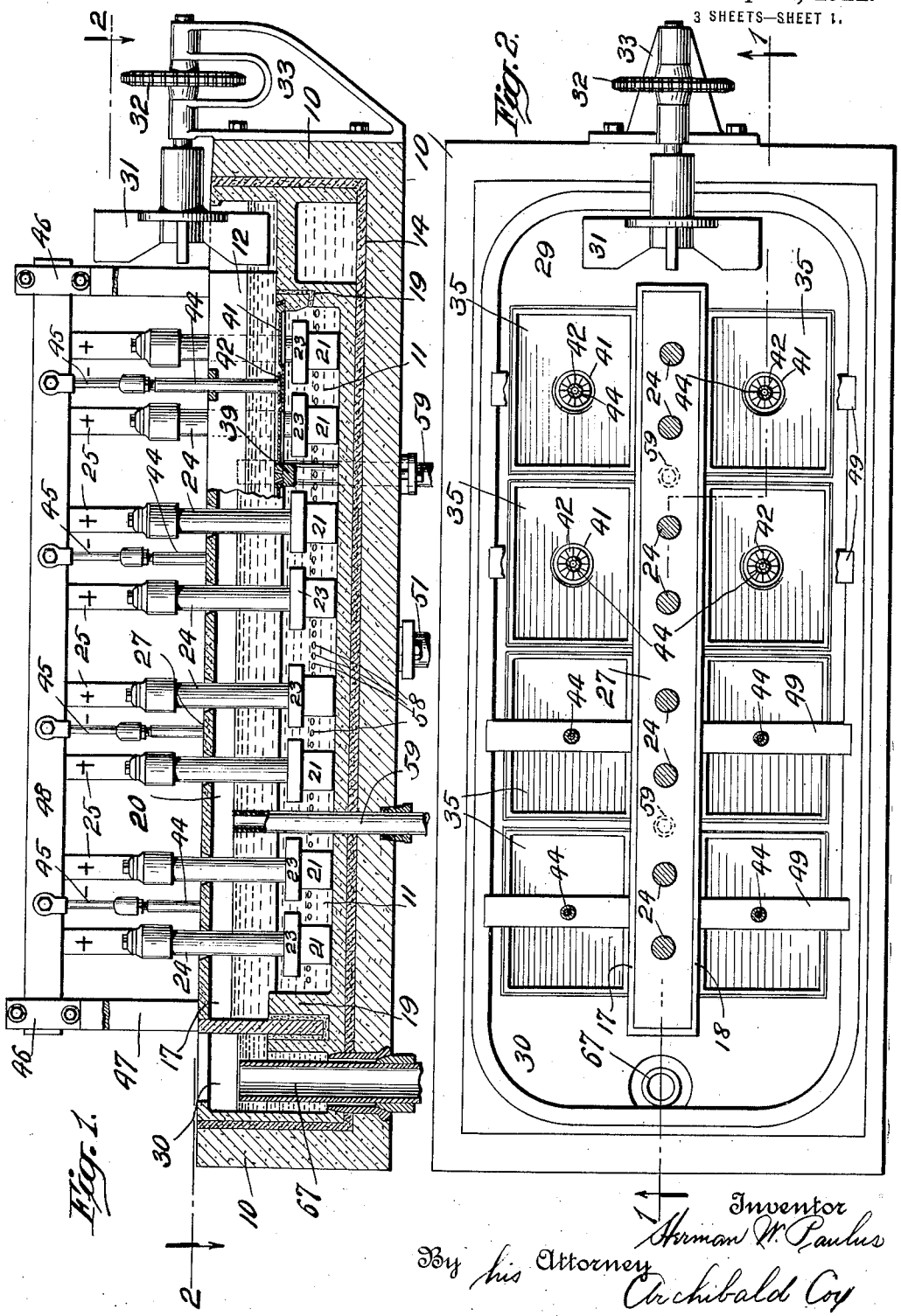

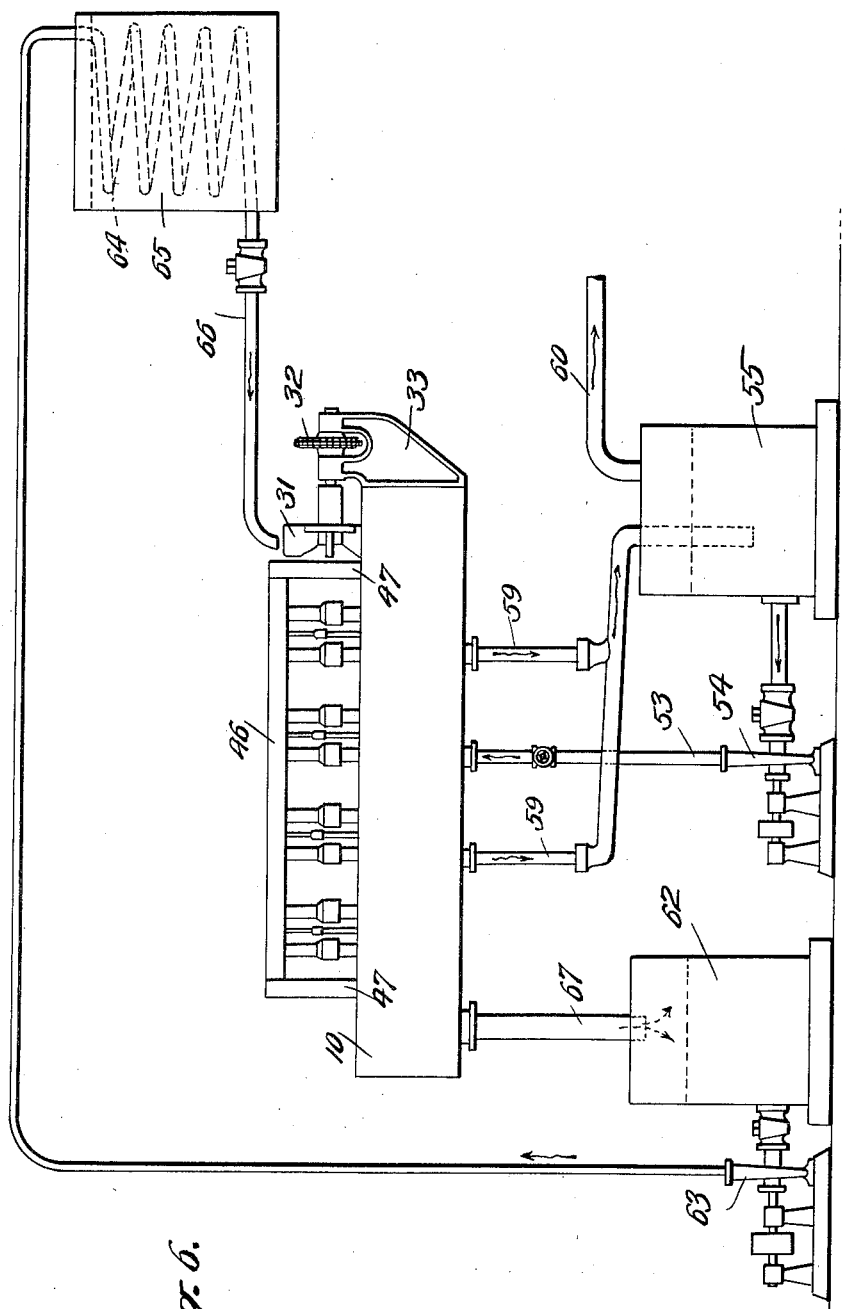

UNITED STATES PATENT OFFICE.

HERMAN W. PAULUS, OF RICHMOND HILL, NEW YORK, ASSIGNOR TO ROYAL BAKING POWDER COMPANY, A CORPORATION OF NEW JERSEY.

APPARATUS FOR EFFECTING CHEMICAL REACTIONS BY MEANS OF AMALGAMS.

1,411,507.  Specification of Letters Patent.  Patented Apr. 4, 1922.

Application filed February 26, 1921. Serial No. 448,125.

*To all whom it may concern:*

Be it known that I, HERMAN W. PAULUS, a citizen of the United States, residing at Richmond Hill, Long Island, county of Queens, and State of New York, have invented certain new and useful Improvements in Apparatus for Effecting Chemical Reactions by Means of Amalgams, of which the following is a specification.

The invention relates to an apparatus for effecting chemical reactions by means of amalgams.

The usual method heretofore employed of effecting chemical reactions by means of amalgams was to pass a sheet of mercury through an electrolytic cell containing the salt of the metal to be converted into the amalgam and use the mercury as a carrier for the amalgam to convey it to the reduction chamber to react with the materials to be reduced. This method required a relatively large amount of mercury, a separate piece of apparatus for the electrolytic cell, another piece of apparatus for the reduction chamber, and a relatively large amount of housing area for the whole apparatus. Moreover, in order to secure a proper flow of the mercury to the reduction chamber it was found preferable to use properly machined iron plate. But iron forms an amalgam with mercury which, although it is almost insoluble, nevertheless is found in small traces in the solutions reacted upon by the amalgam, and therefore the product is not chemically pure. There is also a lowering of efficiency due to polarization when iron is employed for the mercury conduits or passageways.

One object of the invention is to produce an apparatus for effecting chemical reactions by means of amalgams by which a chemically pure product will be assured. A further object of the invention is to produce an apparatus for effecting chemical reactions by means of amalgams by which there will be a saving of at least 50% of the quantity of mercury at present employed for effecting the same amount of chemical reaction. Another object of the invention is to decrease the cost of apparatus used for effecting chemical reactions by means of amalgams by reducing the size of the apparatus without impairing its efficiency or capacity of production. Other objects of the invention will be pointed out as the description proceeds.

These objects are accomplished by the apparatus of the present invention in which a sheet of mercury is maintained in a stationary position, one surface of the mercury is utilized for the formation of the amalgam, and the other surface of the mercury is utilized for effecting the chemical reaction of the amalgam upon the material to be reduced. By utilizing both surfaces of the mercury in this manner, instead of only one surface of the mercury, it is possible to combine both the electrolytic cell and the reduction chamber in one piece of apparatus, thereby effecting all the advantages it is the object of the invention to produce, namely: the elimination of metal from the construction of the apparatus, the saving of mercury, the reduction in size of the apparatus, the economy of manufacture and the saving in floor space.

The preferred form of the invention is illustrated in the accompanying drawings in which Fig. 1 is a longitudinal sectional view taken on the line 1—1 of Fig. 2; Fig. 2 is a sectional plan taken on the line 2—2 of Fig. 1; Fig. 3 is an enlarged transverse section through the apparatus; Fig. 4 is an enlarged sectional view through one of the pans or receptacles for containing the mercury. Fig. 5 is a sectional plan of one of the cathode spiders; Fig. 6 is a diagrammatic representation of the apparatus and its accessory tanks and pumps for maintaining a circulation of the electrolyte and the materials being acted upon by the amalgam.

The improved apparatus for effecting chemical reactions by means of amalgams comprises means for maintaining a film or layer of mercury in a stationary position, and supporting the mercury in such manner that a flow of electrolyte can be maintained in contact with one surface of the mercury so as to form the amalgam thereon and so that a flow of the material to be acted upon can be maintained in contact with the other surface of the mercury. The mercury is so arranged that when the amalgam is formed on one side thereof, it passes through the mercury and acts upon the material in contact with the other side of the mercury. By this means, both sides of the mercury are brought into use or operation. Thus at least a 50% saving in the quantity of mercury necessary to carry on the reactions is effected by the present invention over the quantity of mercury formerly required for this purpose. It will conduce to clearness of understanding to describe first the whole apparatus and then the parts more particularly used for effecting the chemical reactions.

The improved apparatus comprises an electrolytic cell 10. This cell consists of a substantially rectangular stoneware tank of which only the lower part 11 is, strictly speaking, the electrolytic cell, the upper half 12 of the tank being used for the reduction chamber for containing the material to be acted upon by the amalgam. The tank 10 comprises an inner casing 15 composed of stoneware, a reinforced concrete casing 13 completely enveloping the stoneware tank and a layer of cement 14 to secure the proper bondage between the two vessels. The inner compartment 15 is so constructed as to support the various parts of the apparatus which will be presently described. Arranged longitudinally of the apparatus and extending the full length thereof are two slabs 17 and 18 composed of some insulating material such as slate. These slabs rest at each end on bosses 19 rising from the bottom of the inner compartment 15. The slabs 17 and 18 are spaced apart so as to form an elevated anode chamber, the upper part of which constitutes a gas chamber 20. Resting on insulating blocks 21 placed in the bottom of the cell 11 are a series of anodes 23 composed of some suitable material such as graphite. Each anode 23 is provided with an anode lead 24 which passes up through the gas chamber 20 and is connected by a lead 25 with an anode bus bar 26 which conveys the positive electric current to the anode. A cover 27 provided with holes for the accommodation of the anode leads 24 closes the gas chamber 20 so as to prevent leakage of gas therefrom. The electrolytic cell 11 occupies the whole bottom of the tank 10 and in addition the middle space or gas chamber 20 formed by the two slabs 17 and 18.

The reduction chamber 12 occupies the whole of the upper half of the tank 10 with the exception of the gas chamber 20. Thus the reduction chamber is divided into two parts. In order that there may be a circulation of the material to be acted upon by the amalgam, the reduction chamber is extended at one end of the tank to form a paddle compartment 29 and at the other end of the tank to form a discharge compartment 30. In the paddle compartment is located a porcelain or stoneware paddle 31 driven by a sprocket wheel 32 journaled in a bracket 33 secured to the end of the tank 10.

The reduction chamber 12 is separated from the electrolytic cell 11 by two series of pans or receptacles 35 which act as diaphragms. These diaphragms are composed of some porous material impervious to the passage of mercury but permeable to the electrolyte. Each porous diaphragm 35 is provided with a rim 36, and the rims 36 are supported along their outer edges in shoulders 37 formed in inserts 38 placed along the sides of the inner compartment 15. The ends of the edges or rims 36 of the diaphragms are supported by transverse supports 39 extending across the cell. These porous diaphragms are adapted to support a relatively thin sheet or layer of mercury which acts as the cathode and upon which the amalgam is formed. The middle portion 41 of each diaphragm is depressed into dish-like form and in this depression is suspended a spider 42 which conducts the negative current from the cathode. The spider 42 is secured to the bottom end of a cathode lead 43 enclosed in a glass or porcelain tube 44 to prevent the acids in the reduction chamber from attacking the conducting material of which the cathode lead is composed. The cathode leads are connected to flexible cables 45 reaching down from a bus bar support 46 mounted on insulated uprights 47 rising from the top of the tank. The cables 45 are connected with a cathode bus bar 48. The tubes 44 pass through transverse supports 49 in order to hold the cathode leads and the spiders 42 against displacement.

The electrolyte is introduced into the electrolytic chamber 11 through the pipes 51 and 52 fed from the main 53 which is connected with a pump 54 fed by a tank 55 which contains the solution used for the electrolyte. The feed pipes 51 and 52 open respectively into conduits 56 and 57 formed in the lower side edges of the inner compartment 15. The conduits 56 and 57 discharge into the cell 11 through small apertures 58 extending throughout the length of the cell. This method of introducing the electrolyte into the electrolytic cell insures a constant flow of the electrolyte past and in contact with the bottoms of the porous diaphragms for supporting the mercury. Thus no gas is permitted to accumulate at the bottom surfaces of the diaphragms. Having passed by the diaphragms to be acted upon by the electric current passing from the anodes to the mercury cathodes, the electrolyte passes up into the gas chamber 20 and from thence the impoverished electrolyte flows down through the discharge pipes 59 and back into the tank 55 to be resaturated. Whatever gas is formed by the electrolytic action accumulates in the gas chamber 20 and also passes down through the pipes 59 into the tank 55 and out through the discharge pipe 60.

The material to be acted upon by the amalgam is contained in a tank 62 whence it is raised by a pump 63 into a tank 64 containing a cooling coil 65. From the tank 64 the material to be acted upon by the amalgam passes through a pipe 66 into the paddle compartment 29 and the reduction chamber 12. As before pointed out, a circulation or flow of the material is maintained over the mercury by means of the paddle wheel 31. Having been acted upon by the amalgam, the material is discharged from the chamber 12 through an overflow pipe 67 opening into the overflow compartment 30. It has been found preferable to cool the material acted upon by the amalgam rather than the mercury, on account of its greater volume and greater specific heat.

The chemical reactions effected by means of amalgams practiced in the apparatus described above is as follows:—For the purpose of illustration, it is assumed that the electrolyte is sodium chloride and that it is desired to convert oxalic acid into glyoxylic acid. The sodium chloride is caused to flow under the porous diaphragms upon which is spread the layer of mercury. The sodium chloride passes up through the diaphragms which are permeable to it and comes into contact with the bottom surface of the mercury where it is decomposed into its constituent parts and the sodium forms an amalgam with the mercury. The liberated chlorine gas is washed out from under the diaphragms by the flow of sodium chloride and passes up into the gas chamber 20 and thence by the means described out through the discharge pipe 60. The sodium amalgam being of lower specific gravity than the mercury passes up through the mercury and spreads over the upper surface thereof where it acts upon the flow of acid maintained over the mercury and converts the oxalic acid into sodium glyoxylate. The free hydrogen necessary for the reaction may be augmented by adding some acid such as hydrochloric acid to the solution containing oxalic acid.

It will be recognized from the above description that by means of the apparatus of the present invention a considerable economy is effected in processes involving the use of amalgams. Fully 50% of the mercury heretofore employed for the purpose is saved. There is also a saving of fully 50% of floor space by superimposing the reduction chamber over the electrolytic cell and a considerable saving in the cost of manufacturing the apparatus is also effected. Moreover, the product of the processes performed in the apparatus are more nearly chemically pure because it is possible to employ a chemically inert substance such as porcelain or stoneware for all the parts of the apparatus except the electrodes. It will be understood that the invention is not to be limited to the precise form of apparatus shown, but that the form of the apparatus may vary considerably from the illustrated form and still be within the scope of the following claims.

Having thus described the invention, what I claim as new is:—

1. An apparatus for use in effecting chemical reactions by means of amalgams comprising a stationary receptacle having a porous bottom impervious to mercury for containing a sheet of mercury, means for bringing an electrolyte in contact with the surface of the mercury resting on the porous bottom of the receptacle, means for passing an electric current through the mercury and means for bringing the material to be acted upon by the amalgam in contact with the upper surface of the mercury.

2. An apparatus for use in effecting chemical reactions by means of amalgams comprising a receptacle for containing a sheet of mercury, said receptacle having one side in contact with the mercury impervious to the mercury but permeable by the electrolyte, means for bringing the electrolyte in contact with the mercury, means for passing the electric current through the mercury to form amalgam and means for bringing the material to be acted upon by the amalgam opposite to that in contact with the electrolyte.

3. An apparatus for use in effecting chemical reactions by means of amalgams comprising means for supporting a sheet of mercury, means for bringing an electrolyte in contact with one of the surfaces of the mercury, means for passing an electric current through the mercury to form amalgam and means for bringing the material to be acted upon by the amalgam in contact with the other surface of the mercury.

4. An apparatus for use in effecting chemical reactions by means of amalgams comprising a receptacle having a bottom impervious to mercury but permeable by an electrolyte, a layer of mercury in the receptacle, means for bringing the electrolyte in contact with the bottom of the receptacle, means for passing an electric current through the electrolyte to form amalgam and means for bringing the material to be acted upon by the amalgam in contact with the upper surface of the mercury.

5. An apparatus for use in effecting chemical reactions by means of amalgams comprising an electrolytic cell for containing an electrolyte, an electrode in the cell, a reduction chamber, a porous partition impervious to mercury but permeable by the electrolyte between the cell and the chamber, a layer of mercury on the partition and an electrode in the chamber and means for passing the electric current from one electrode to the other.

6. An apparatus for use in effecting chemical reactions by means of amalgams comprising an electrolytic cell for containing electrolyte, a chamber for containing the material to be acted upon by the amalgam, a porous partition impervious to mercury but permeable by the electrolyte between the cell and the chamber, a layer of mercury resting on the partition and means for passing the electric current through the electrolyte and mercury to form amalgam on the lower surface of the mercury, said amalgam rising through the mercury to act upon the material in the chamber.

7. An apparatus for use in effecting chemical reactions by means of amalgams comprising an electrolytic cell for containing electrolyte, an anode in the cell, a chamber for containing the material to be acted upon by the amalgam situated above the cell, a porous partition impervious to mercury but permeable by electrolyte between the cell and the chamber, a layer of mercury on the partition, means for conducting electric current to the anode and means for conducting the current from the mercury cathode.

8. An apparatus for use in effecting chemical reactions by means of amalgams comprising a cell for containing electrolyte, a chamber for containing the material to be acted upon by the amalgam situated above the cell, a porous partition impervious to mercury but permeable by the electrolyte between the cell and the chamber, a layer of mercury on the partition and means for passing the electric current through the electrolyte and the mercury to form amalgam on the bottom surface of the mercury, said amalgam passing through the mercury to act upon the material in the chamber.

9. An apparatus for use in effecting chemical reactions by means of amalgams comprising an electrolytic cell for containing electrolyte, a chamber for containing the material to be acted upon by the amalgam, a series of porous partitions impervious to mercury but permeable by the electrolyte between the cell and the chamber, a layer of mercury over each partition, an anode in each partition, a cathode lead inserted in each layer of mercury, means for causing electrolyte to flow over the anodes and bottoms of the partitions and means for causing the material to be acted upon to flow over the upper surface of the mercury.

10. An apparatus for use in effecting chemical reactions by means of amalgams comprising an electrolytic cell for containing electrolyte, inlets for the electrolyte arranged along the bottom of the side edges of the cell, outlets for the electrolyte arranged along the middle of the cell, a series of anodes in the cell, a chamber for containing the material to be acted upon arranged over each side of the cell, a series of porous partitions impervious to mercury but permeable by the electrolyte between the cell and the chambers, a layer of mercury over each partition, means for causing a circulation of the material to be acted upon by the amalgam through the chambers, means for passing an electric current from the anodes through the mercury to form amalgam on the bottom of the mercury.

11. An apparatus for use in effecting chemical reactions by means of amalgams comprising a cell for containing the material to be acted upon by the amalgam, means for supporting a layer of mercury between the cell and the chamber, means for causing the electrolyte to flow under the mercury and means for passing an electric current through the electrolyte and the mercury to form amalgam on the lower surface of the mercury.

12. An apparatus for use in effecting chemical reactions by means of amalgams comprising a cell for containing electrolyte, a chamber containing the material to be acted upon by the amalgam, means for separating the electrolyte in the cell from the material in the chamber, said means acting as a support for a layer of mercury, means for passing an electric current through the electrolyte and the mercury to form amalgam and means for causing the material in the chamber to flow over the mercury.

13. An apparatus for use in effecting chemical reactions by means of amalgams comprising a cell for containing electrolyte, a chamber containing the material to be acted upon by the amalgam, means for supporting a layer of mercury between the electrolyte in the cell and the material in the chamber so that one side of the mercury is in contact with the electrolyte and the other side of the mercury is in contact with the material, and means for passing the electric current through the electrolyte and the mercury to form amalgam on one surface of the mercury, said amalgam being permitted to pass through the mercury to act upon the material in contact with the other side of the mercury.

14. An apparatus for use in effecting chemical reactions by means of amalgams comprising means for supporting a layer of mercury, means for bringing electrolyte in contact with one surface of the mercury so as to form amalgam thereon and means for bringing the material to be acted upon by the amalgam in contact with the other surface of the mercury so as to be acted upon by the amalgam which is passed through the mercury.

HERMAN W. PAULUS.